(12) United States Patent
Kim

(10) Patent No.: US 10,712,593 B2
(45) Date of Patent: Jul. 14, 2020

(54) VIEWING ANGLE CONTROL FILM AND LIQUID CRYSTAL DISPLAY DEVICE INCLUDING THE SAME

(71) Applicant: LG Display Co., Ltd., Seoul (KR)

(72) Inventor: Ja-Hyeon Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/213,820

(22) Filed: Dec. 7, 2018

(65) Prior Publication Data

US 2019/0179179 A1   Jun. 13, 2019

(30) Foreign Application Priority Data

Dec. 13, 2017   (KR) ........................ 10-2017-0171127

(51) Int. Cl.
*G02F 1/13*   (2006.01)
*F21V 8/00*   (2006.01)

(52) U.S. Cl.
CPC ......... *G02F 1/1323* (2013.01); *G02B 6/0051* (2013.01); *G02B 6/0053* (2013.01); *G02B 6/0073* (2013.01)

(58) Field of Classification Search
CPC ... G02F 1/1323; G02B 6/0051; G02B 6/0073; G02B 6/0053
See application file for complete search history.

(56) References Cited

U.S. PATENT DOCUMENTS

| | | | |
|---|---|---|---|
| 8,012,567 B2 | 9/2011 | Gaides et al. | |
| 8,133,572 B2 | 3/2012 | Gaides et al. | |
| 9,063,284 B2 | 6/2015 | Jones et al. | |
| 2005/0174529 A1* | 8/2005 | Fukushima | G02F 1/1323 349/197 |
| 2007/0160811 A1 | 7/2007 | Gaides et al. | |
| 2009/0284836 A1* | 11/2009 | Boyd | G02B 5/003 359/613 |
| 2010/0265435 A1* | 10/2010 | Hwang | G02F 1/1323 349/64 |
| 2011/0262708 A1 | 10/2011 | Gaides et al. | |
| 2012/0154885 A1 | 6/2012 | Jones et al. | |
| 2014/0376100 A1 | 12/2014 | Jones et al. | |
| 2015/0362741 A1* | 12/2015 | Oh | G02B 27/2214 349/15 |
| 2019/0346708 A1* | 11/2019 | Wang | G02F 1/13306 |

FOREIGN PATENT DOCUMENTS

| | | |
|---|---|---|
| KR | 10-1257136 B | 4/2013 |
| KR | 10-1714807 B | 3/2017 |

\* cited by examiner

*Primary Examiner* — Jia X Pan
(74) *Attorney, Agent, or Firm* — Fenwick & West LLP

(57) ABSTRACT

A liquid crystal display device includes a liquid crystal panel, a backlight unit below the liquid crystal panel, and a viewing angle control film between the liquid crystal panel and the backlight unit. The viewing angle control film includes a plurality of separation wall patterns that constitute each of a plurality of separation wall group arranged along a first axis, and that each extend along a second axis perpendicular to the first axis. The plurality of separation wall patterns are reduced in height along a direction of the first axis.

11 Claims, 4 Drawing Sheets

VIEWING ANGLE CONTROL FILM AND LIQUID CRYSTAL DISPLAY DEVICE INCLUDING THE SAME

CROSS-REFERENCE TO RELATED APPLICATIONS

The present application claims the priority benefit of Republic of Korea Application No. 10-2017-0171127 filed on Dec. 13, 2017, which is hereby incorporated by reference in its entirety.

BACKGROUND

Field of Disclosure

The present disclosure relates to a viewing angle control film and a liquid crystal display device including the same.

Discussion of the Related Art

Facing information society, needs for display devices have increased variously. Recently, flat display devices, such as a liquid crystal display (LCD) device, a plasma display panel (PDP) device, and an organic light emitting diode (OLED) display device, are used.

Among these display devices, LCD devices are widely used because of advantages in a lightweight, a thin profile, a low power consumption and the like.

Recently, the LCD device has been used as an information display device for a vehicle. For example, the LCD device is used as an instrument panel in front of a driver, or is installed in a center fascia and is used as a center information display (CID), or is installed in a dash board in front of a passenger and is used as an ambient information display (AID).

In order to prevent a phenomenon that an image displayed from the AID is reflected on a passenger side window (or glass), a viewing angle control film as a light control film to narrow a viewing angle in an axis i.e., a horizontal axis is applied to an LCD device.

However, a viewing angle control film according to the related art equally limits viewing angles in both directions i.e., left and right directions on the horizontal axis.

Accordingly, a brightness of an image output toward a driver and a passenger respectively located at both directions of the horizontal axis is reduced, and thus a visibility of both of the driver and the passenger to the image is reduced. Particularly, a visibility of the driver, who is located more laterally on the horizontal axis than the passenger, is seriously reduced, and thus the driver may not view an image in a situation that the driver needs to view the image.

SUMMARY OF THE DISCLOSURE

Accordingly, the present disclosure is directed to a viewing angle control film and a liquid crystal display (LCD) device including the same that substantially obviate one or more of the problems due to limitations and disadvantages of the related art.

An object of the present disclosure is to provide a viewing angle control film and an LCD device including the same that can asymmetrically control viewing angles of both directions on an axis.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a liquid crystal display device includes: a liquid crystal panel; a backlight unit below the liquid crystal panel; and a viewing angle control film between the liquid crystal panel and the backlight unit, wherein the viewing angle control film includes a plurality of separation wall patterns that constitute each of a plurality of separation wall group arranged along a first axis, and that each extend along a second axis perpendicular to the first axis, and wherein the plurality of separation wall patterns are reduced in height along a direction of the first axis.

In another aspect, a viewing angle control film for a liquid crystal display device includes: a plurality of separation wall patterns that constitute each of a plurality of separation wall group arranged along a first axis, and that each extend along a second axis perpendicular to the first axis, wherein the plurality of separation wall patterns are reduced in height along a direction of the first axis.

In another aspect, a liquid crystal display device includes: a liquid crystal panel; a backlight unit below the liquid crystal panel; and a viewing angle control film between the liquid crystal panel and the backlight unit, wherein the viewing angle control film includes a plurality of separation wall patterns that constitute each of a plurality of separation wall group arranged along a first axis, and that each extend along a second axis perpendicular to the first axis, and wherein the plurality of separation wall patterns are asymmetry in height between left and right directions on the first axis.

In another aspect, a viewing angle control film for a liquid crystal display device includes: a plurality of separation wall patterns that constitute each of a plurality of separation wall group arranged along a first axis, and that each extend along a second axis perpendicular to the first axis, wherein the plurality of separation wall patterns are asymmetry in height between left and right directions on the first axis.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Reference will now be made in detail to exemplary embodiments, examples of which are illustrated in the accompanying drawings. The same reference numbers may be used throughout the drawings to refer to the same or like parts.

In the embodiments below, an LCD device applied to an AID installed in a dash board of a vehicle in front of a passenger may be explained by way of example. All the components of the LCD device according to all embodiments of the present disclosure are operatively coupled and configured.

Figure 1:
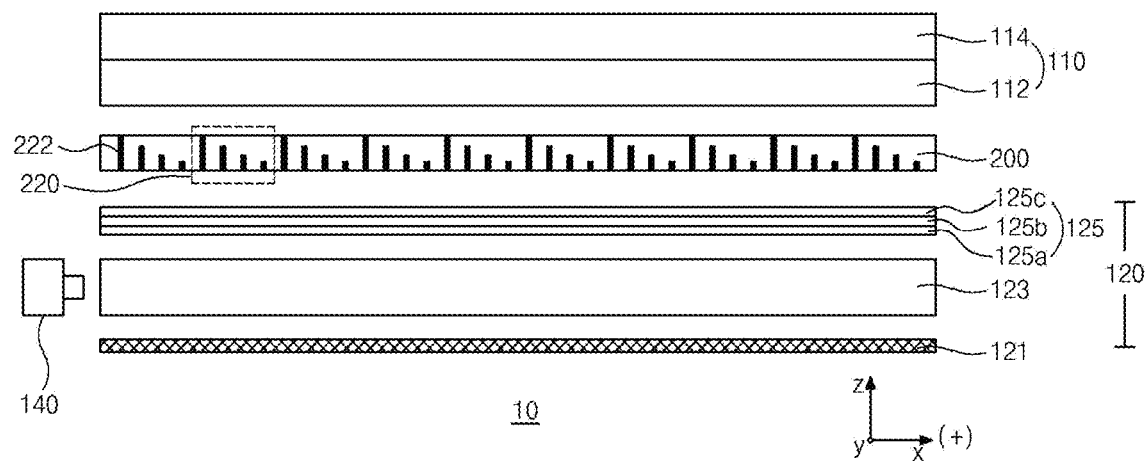
FIG. 1 is a cross-sectional view illustrating an LCD device according to an embodiment of the present disclosure.

FIG. 1 is a cross-sectional view illustrating an LCD device according to an embodiment of the present disclosure.

Referring to FIG. 1, the LCD device 10 may be used as, but not limited to, an information display device installed in a vehicle.

For purpose of explanations, it is assumed that two side surfaces of the display device 10 that are perpendicular to each other are parallel with x axis and y axis, respectively, and a z axis is normal to a plane of the display device 10 i.e., an x-y plane. Further, in a state that the LCD device 10 is installed in a vehicle, the x axis parallel with a side surface of the LCD device 10 may be aligned substantially in parallel with a ground surface.

The LCD device 10 may include a liquid crystal panel 110 as a display panel, a backlight unit 120 below the liquid crystal panel 110, and a viewing angle control film 200 (or light control film) between the liquid crystal panel 110 and the backlight unit 120.

The viewing angle control film 200 may be considered as a component included in the backlight unit 120.

The LCD device 10 may include structural components, for example, a guide panel, a top case and a bottom cover to be coupled with and to modulize the liquid crystal panel 110, the backlight unit 120 and the viewing angle control film 200.

The guide panel surrounds sides of the liquid crystal panel 110, the backlight unit 120 and the viewing angle control film 200, and has a rectangular frame shape. The liquid crystal panel 110 may be placed on the guide panel, and may be attached to a top surface of the guide panel using an adhesive member such as a double-sided adhesive tape.

The bottom cover protects and supports a bottom surface of the backlight unit 120. The bottom cover may include a base portion which the backlight unit 120 is placed on, and side wall portions bent upward from edges of the base portion. The backlight unit 120 and the viewing angle control film 200 may be placed in an inner space defined by the base portion and the side wall portions.

The top case has a rectangular frame shape, and covers edge portions of the liquid crystal panel 110.

The liquid crystal panel 110, the backlight unit 120 and the viewing angle control film 200 may be modulized by the guide panel, the bottom cover, and the top case.

The liquid crystal panel 110 is a component to display images, and includes first and second substrates 112 and 114 facing each other, and a liquid crystal layer therebetween.

On an inner surface of the first substrate 112 that may be referred to as a lower substrate or an array substrate, gate lines and data lines cross each other to define pixels.

A thin film transistor connected to the corresponding gate and data lines and a pixel electrode connected to the thin film transistor are formed in each pixel.

On an inner surface of the second substrate 114 that may be referred to as an upper substrate or a color filter substrate, a color filter pattern corresponding to each pixel and a black matrix surrounding the color filter pattern and corresponding to the gate line, the data line and the thin film transistor may be formed, but the embodiments of the present disclosure are not limited thereto.

All types of liquid crystal panels may be available as the liquid display panel 110. For example, an IPS type, AH-IPS type, TN type, VA type, or ECB type liquid crystal panel may be used.

In case of the IPS type or AH-IPS type, a common electrode to produce an in-plane electric field along with a pixel electrode is formed at the first substrate 112.

Each of the first and second substrates 112 and 114 may include an alignment layer contacting the liquid crystal layer to align liquid crystal molecules of the liquid crystal layer. A seal pattern may be formed between peripheries of the first and second substrates 112 and 114.

Further, a polarization plate may be attached to at least one of the first and second substrates 112 and 114.

A printed circuit board to drive the liquid crystal panel 110 may be connected to at least one side of the liquid crystal panel 110 through a flexible circuit film or the like.

The backlight unit 120 is a component to supply a backlight to the liquid crystal panel 110. A direct type or side edge type backlight unit may be used as the backlight unit 120. In this embodiment, a side edge type backlight unit 120 is illustrated by way of example.

This backlight unit 120 may include a reflecting plate 121, a light guide plate 123 on the reflecting plate 121, at least one optical sheet 125 on the light guide plate 123, and light emitting diodes (LEDs) 140 as light sources located corresponding to a side surface i.e., a light entering surface of the light guide plate 123.

The reflecting plate 121 may have a white color or silver color for a light reflection. The reflecting plate 121 is located below the light guide plate 123, and functions to reflect a light, which passes through a bottom surface of the light guide plate 123, toward the liquid crystal panel 110 to increase brightness.

A light from the LEDs 140, which are arranged along a length direction of the light entering surface of the light guide plate 123, enters the light guide plate 123 through the light entering surface of the light guide plate 123, then travels in the light guide plate 123 by several total reflections to spread uniformly, and then is output from the light guide plate 123 toward the liquid crystal panel 110.

The backlight unit 120 may include a printed circuit board which the LEDs 140 are mounted and arranged on.

The optical sheet(s) 125 may be located on the light guide plate 123. When a plurality of optical sheets 125 are used, by way of example, the optical sheets 125 may include a diffusion sheet 125a, a prism sheet 125b, and a brightness enhancement sheet 125c such as a DBEF (dual brightness enhancement film).

The viewing angle control film 200 may be located between the backlight unit 120 and the liquid crystal panel 110.

The viewing angle control film 200 processes a light output from the backlight unit 120 while controls an output angle of this light, and supplies this light to the liquid crystal panel 110.

In this regard, in order to limit a viewing angle on a first axis, for example, the x axis, the viewing angle control film 200 may include a plurality of separation wall patterns 222 as a plurality of viewing angle control patterns that are configured to extend along a second axis i.e., the y axis perpendicular to the first axis.

Regions between the separation wall patterns 222 may be filled with an air, or a transparent material that has a light transmission function.

The separation wall pattern 222 extending along the y axis serves to block a light traveling along a path toward a side surface thereof. Accordingly, an output of a light, which is from the backlight unit 120 and is incident on the viewing angle control film 200, is limited on the x axis, and thus a profile of the light output on the x axis is reduced (or narrowed).

As such, the viewing angle control film 200 serves to control a profile of a light supplied to the liquid crystal panel 110, thus a viewing angle of the LCD device 10 is limited, and thus a narrow viewing angle on the x axis can be achieved.

Accordingly, when the LCD device 10 is installed with the x axis as the horizontal axis, viewing angles of both directions on the horizontal axis can be reduced, and a phenomenon that an image is reflected on a passenger side window can be improved (or reduced).

Further, in this embodiment, the viewing angle control film 200 is configured to control a viewing angle asymmetrically at left and right directions on the x axis.

For example, the viewing angle control film 200 may be configured such that a viewing angle in a direction (e.g., +x direction) toward a driver, who is located relatively more laterally on the x axis, increases (or is widened) relatively while a viewing angle in a direction (e.g., −x direction) toward a passenger, who is located opposite to the driver on the x axis, is reduced (or is narrowed) relatively.

To do this, the viewing angle control film 200 has the separation wall patterns 222 arranged in an asymmetric form. For example, the separation wall patterns 222 may be arranged such that the separation wall patterns 222 are reduced in height toward a direction on the x axis in which a relatively greater viewing angle is produced.

Accordingly, a viewing angle in the direction toward the passenger is reduced so that an image reflection on a passenger side window can be reduced, and a viewing angle in the direction toward the driver increases so that an image visibility of the driver can be secured.

Figure 2:
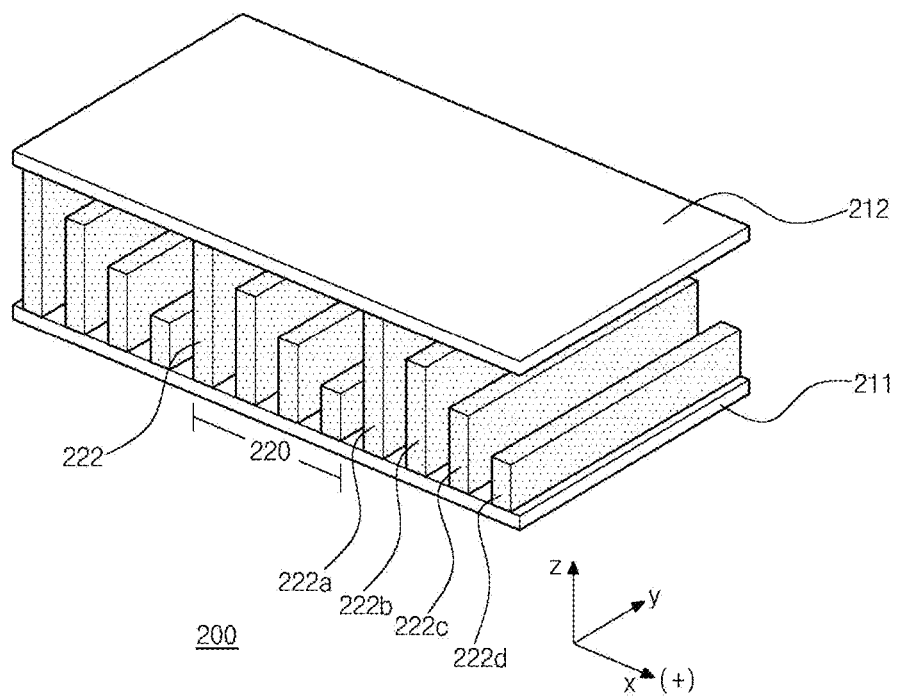
FIGS. 2 and 3 are perspective view and cross-sectional view, respectively, illustrating a viewing angle control film according to an embodiment of the present disclosure.
Figure 3:
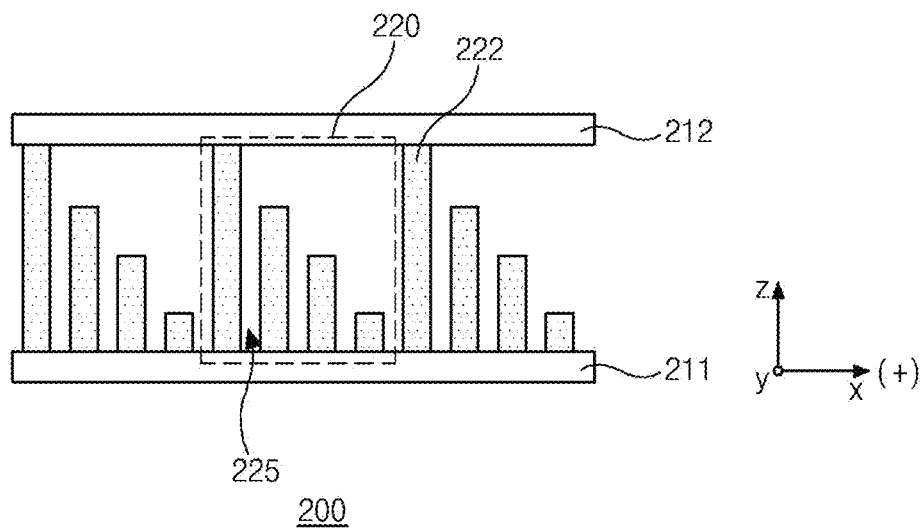

The viewing angle control film 200 is explained in detail further with reference to FIGS. 2 and 3.

FIGS. 2 and 3 are perspective view and cross-sectional view, respectively, illustrating a viewing angle control film according to an embodiment of the present disclosure.

Referring to FIGS. 1 to 3, the viewing angle control film 200 is a light control film that serves to limit a viewing angle on the x axis, and can reduce (or narrow) a profile of a light input thereto. Accordingly, the viewing angle of the x axis of the liquid crystal panel 110 becomes narrow.

Particularly, in controlling the viewing angles of the x axis, the viewing angle control film 200 asymmetrically conduct the viewing angle control in both directions (or left and right directions), opposite to each other, of the x axis such that a viewing angle in the +x direction as a first direction out of the both directions is relatively wider while a viewing angle in the −x direction as a second direction out of the both directions is relatively narrower.

This viewing angle control film 200 may include the plurality of separation wall patterns 222 that extend along the y axis perpendicular to the x axis in which the viewing angle control is made and that are parallel with each other.

Further the viewing angle control film 200 may include a first base layer 211 and a second base layer 212 facing each other with the plurality of separation wall patterns 222 therebetween.

The first base layer 211 may be located below the separation wall patterns 222, and the second base layer 212 may be located on the separation wall patterns 222.

The first and second base layers 211 and 212 located below and on the separation wall patterns 222 serves to support and protect the separation wall patterns 222.

The first and second base layers 211 and 212 may be made of a polymer, for example, PC (polycarbonate).

Each separation wall pattern 222 extends along the y axis direction, and serves to block a path of a light incident on a side surface thereof.

To do this, the separation wall pattern 222 may have a light absorption property. For example, the separation wall pattern 222 may include a light absorptive material such as black carbon.

By the separation wall pattern 222, an output light angle in the x axis direction perpendicular to the extension direction of the separation wall pattern 222 can be limited.

A region 225 spaced between the neighboring separation wall patterns 222 may be filled with an air or transparent material.

When the transparent material is used for filling the region 225, a transparent resin may be used by way of example. In this case, the viewing angle control film 200 can have a high refractive property and thus a brightness can increase.

In order that the viewing angle control film 200 controls viewing angles of both directions on the x axis asymmetrically and differently, a separation wall group 220, which is configured with n (3 or greater) separation wall patterns 222 that are arranged to be reduced in thickness along a direction e.g., the +x direction, may be defined, and a plurality of separation wall groups 220 may be arranged repeatedly along the x axis.

In other words, the separation wall group 220, which is configured with n separation wall patterns 222 that are arranged to increase in thickness along the −x direction, may be defined, and a plurality of separation wall groups 220 may be arranged repeatedly along the x axis.

The separation wall group 220 may include 3 or greater separation wall patterns 222, and thus an asymmetric structure of the separation wall patterns 222 on the x axis may be achieved.

In this regard, if two separation wall patterns 222 having different heights constitute a separation wall group 220, this makes a structure that is symmetrical between left and right directions on the x axis. Accordingly, to make the left and right asymmetric structure of height distribution, it is preferred that at least three separation wall patterns 222 being different in height are arranged in each separation wall group 220.

In this embodiment, four separation wall patterns 222 i.e., first to fourth separation wall patterns 222a to 222d are formed in the separation wall group 220 by way of example.

When the separation wall patterns 222 are sequentially arranged to be reduced in thickness along the +x direction, one on the −x direction (i.e., a left one) of the two neighboring separation wall patterns 222 serves as a relatively higher light-blocking wall while the other on the +x direction (i.e., a right one) of the two neighboring separation wall patterns 222 serves as a relatively lower light-blocking wall.

Accordingly, the separation wall group 220 can widen an output light angle in the +x direction that is a height-decreasing direction and can narrow an output light angle in the −x direction that is a height-increasing direction, and can thus achieve an asymmetric viewing angle property.

Therefore, on the x axis where a viewing angle is limited, an asymmetric output light profile can be achieved such that a viewing angle in the −x direction is relatively narrower while a viewing angle in the +x direction is relatively wider.

Figure 4:
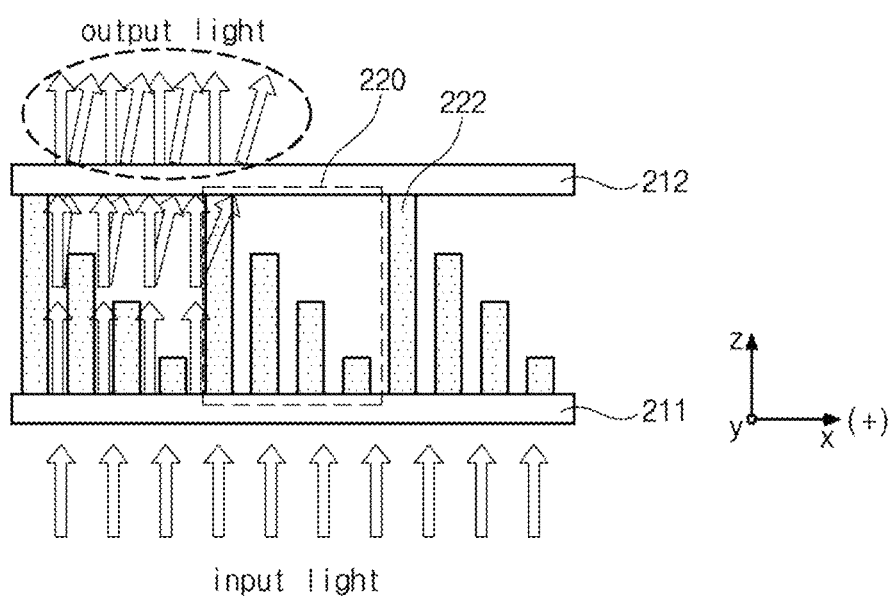
FIG. 4 is a view illustrating an output light path through a viewing angle control film according to an embodiment of the present disclosure.

This refers to FIG. 4, which is a view illustrating an output light path through a viewing angle control film according to an embodiment of the present disclosure.

Referring to FIG. 4, a light from the backlight unit 120 is incident on the viewing angle control film 200, and while the input light passes through the asymmetric separation wall group 220, an output light angle toward the +x direction increases, and thus a viewing angle on the x axis is asymmetric.

The separation wall patterns 222 in the separation wall group 220 are reduced in height in a linear or non-linear form. The linear reduction in height may mean that a height is gradually reduced at a regular rate along the +x direction. The non-linear reduction in height may mean that a height is gradually reduced at a irregular rate along the +x direction.

For example, with respect to a highest separation wall pattern (e.g., the first separation wall pattern 222a) as 100%, a second highest separation wall pattern (e.g., the second separation wall pattern 222b), which is right next to the highest separation wall pattern, may have a height of about 60%~40%, and a lowest separation wall pattern (e.g., the fourth separation wall pattern 222d) may have a height of about 10%~3%.

Further, pitches (or separate distances) between the separation wall patterns 222 are may be identical. Alternatively, the pitches may be different, and the embodiments of the present disclosure are not limited thereto.

Since the separation wall patterns 222, which have the asymmetric structure with the reduction in height along one direction of the horizontal axis as the x axis, are arranged repeatedly, the viewing angle control film 200 can control the viewing angle asymmetrically on the horizontal axis.

Accordingly, a viewing angle in a direction e.g., the +x direction toward a driver, who is located relatively more laterally on the x axis, increases relatively while a viewing angle in a direction e.g., the −x direction toward a passenger, who is located opposite to the driver, is reduced relatively.

Thus, a viewing angle in the direction toward the passenger is reduced so that an image reflection on a passenger side window can be reduced, and a viewing angle in the direction toward the driver increases so that an image visibility of the driver can be secured sufficiently.

Figure 5:
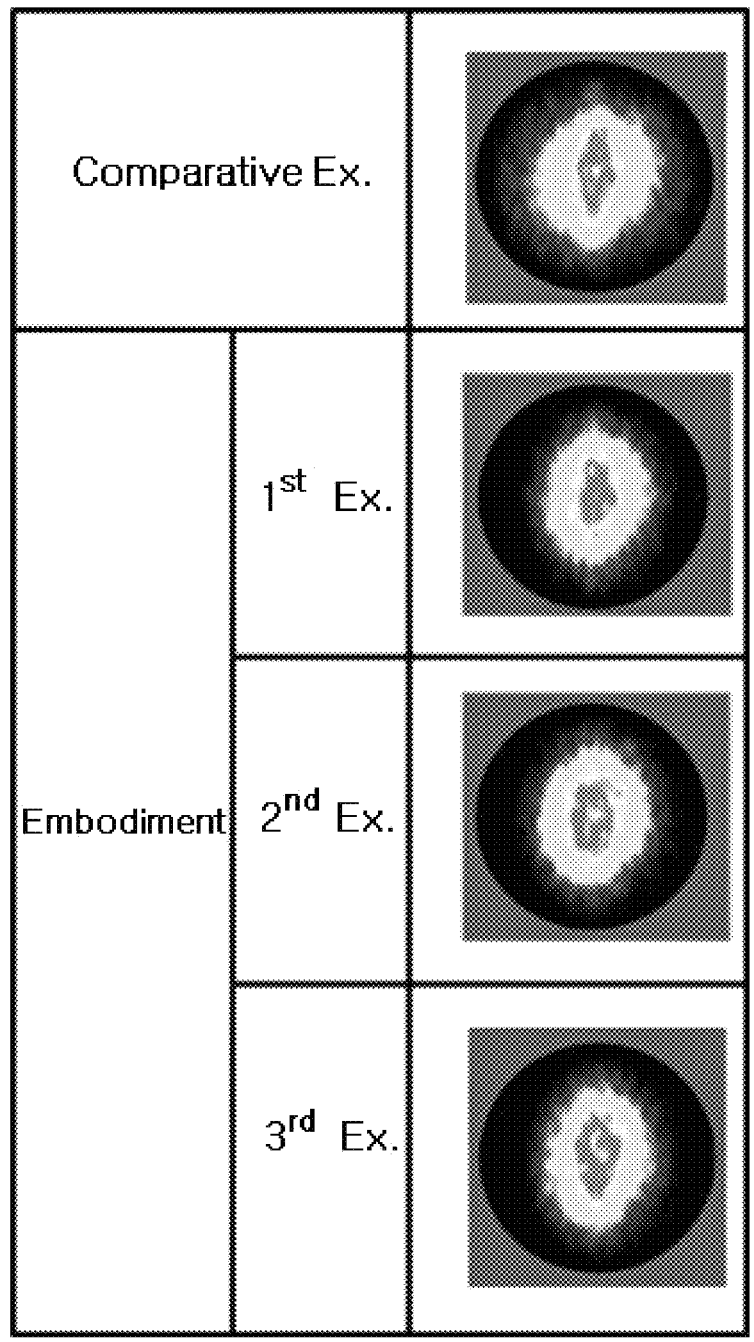
FIGS. 5 and 6 are views illustrating simulation results of output light profiles according to a comparative example and an embodiment of the present disclosure.
Figure 6:
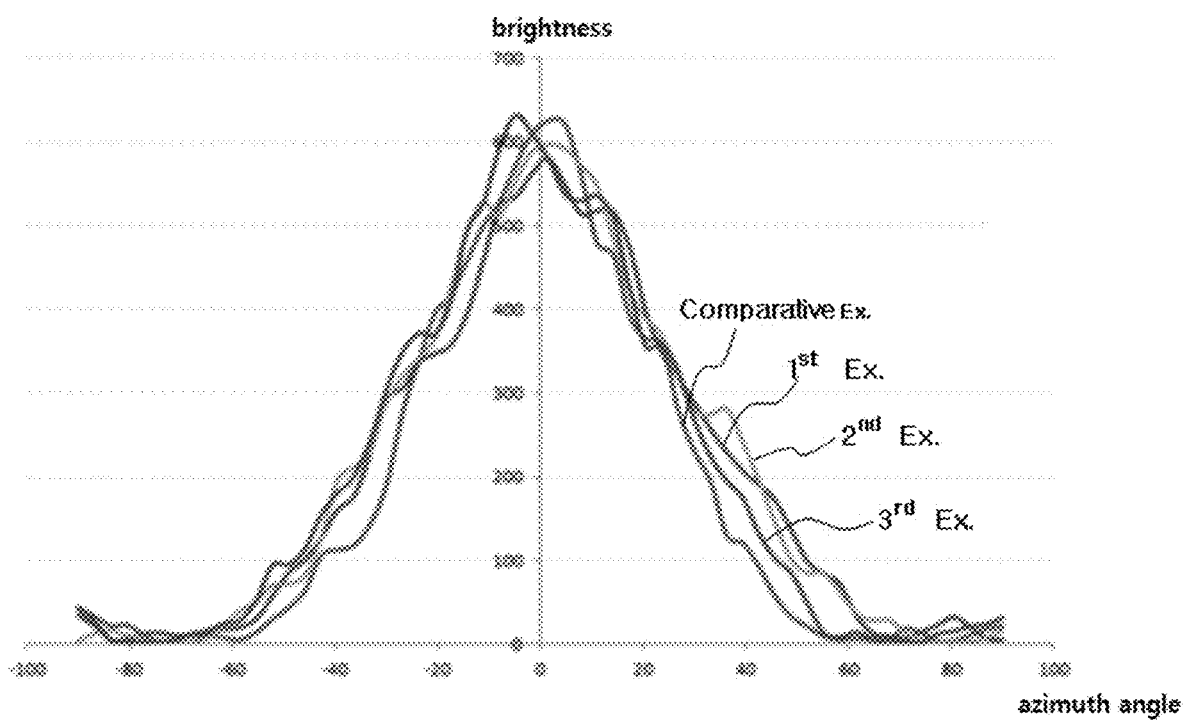

FIGS. 5 and 6 are views illustrating simulation results of output light profiles according to a comparative example and an embodiment of the present disclosure. FIG. 5 shows brightness distribution in a plane view, and FIG. 6 shows brightness distribution in a cross-sectional view along an x axis (i.e., a horizontal axis of FIG. 5).

In FIGS. 5 and 6, the comparative example uses a viewing angle control film having a structure in which separation wall patterns are equal in thickness. First to third examples of the embodiment each use a viewing angle control film having an asymmetric structure in which separation wall patterns are reduced in thickness along a direction. The first example uses seven separation wall patterns arranged at a pitch of 40 um to form a separation wall group, the second example uses four separation wall patterns arranged at a pitch of 40 um to form a separation wall group, and the third example uses seven separation wall patterns arranged at a pitch of 57 um to form a separation wall group. The first and third examples each uses the seven separation wall patterns that have the respective heights, 80 um, 40 um, 30 um, 15 um, 10 um, 8 um and 7 um.

Referring to FIGS. 5 and 6, the comparative example has a brightness distribution on the x axis in a left and right symmetric form.

The first to third examples of the embodiment each have a brightness distribution on the x axis in a left and right asymmetric form.

Further, out of the first to third examples of the embodiment, the first example is the best for a brightness blocking effect on the left and for a brightness securing on the right.

As described above, in this embodiment, the viewing angle control film 200 is used in which the separation wall patterns 222 of the asymmetric structure with the reduction in height along one direction of the horizontal axis are arranged repeatedly Accordingly, since a viewing angle can be controlled asymmetrically on the horizontal axis, a viewing angle in the one direction of the horizontal axis is relatively wider while a viewing angle in an opposite direction of the horizontal axis is relatively narrower.

There, a viewing angle in the opposite direction toward the passenger is reduced so that an image reflection on a passenger side window can be reduced, and a viewing angle in the one direction toward the driver increases so that an image visibility of the driver can be secured sufficiently.

The LCD device of the present disclosure may be applied as various types of information display devices, including a vehicle information display device or as a display in any transportation device/system.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A liquid crystal display (LCD) device, comprising:
a liquid crystal panel;
a backlight unit below the liquid crystal panel; and
a viewing angle control film between the liquid crystal panel and the backlight unit,
wherein the viewing angle control film includes a plurality of separation wall patterns arranged into a plurality of separation wall groups that repeat along a first axis, each of the separation wall groups comprising a set of separation wall patterns that decrease in height along the first axis and extend across an entire length of the viewing angle control film along a second axis perpendicular to the first axis, each of the separation wall patterns having a constant height along the second axis.

2. The LCD device of claim 1, wherein each of the plurality of separation wall groups comprises at least three separation wall patterns.

3. The LCD device of claim 1, wherein when a highest one out of the plurality of separation wall patterns has a height of 100%, a second highest one right next to the highest one has a height of about 60%-40%, and a lowest one has a height of about 10%-3%.

4. The LCD device of claim 3, wherein the plurality of separation wall patterns are spaced apart from each other at a same pitch.

5. The LCD device of claim 1, wherein the backlight unit includes:

a light guide plate;
a light source facing a light entering surface of the light guide plate; and
at least one optical sheet on the light guide plate.

6. A viewing angle control film for a liquid crystal display device, comprising:
a plurality of separation wall patterns arranged into a plurality of separation wall groups that repeat along a first axis, each of the separation wall groups comprising a set of separation wall patterns that decrease in height along the first axis and extend across an entire length of the viewing angle control film along a second axis perpendicular to the first axis, each of the separation wall patterns having a constant height along the second axis.

7. The viewing angle control film of claim 6, wherein each of the plurality of separation wall groups comprises at least three separation wall patterns.

8. The viewing angle control film of claim 6, wherein when a highest one out of the plurality of separation wall patterns has a height of 100%, a second highest one right next to the highest one has a height of about 60%-40%, and a lowest one has a height of about 10%-3%.

9. The viewing angle control film of claim 8, wherein the plurality of separation wall patterns are spaced apart from each other at same pitch.

10. A liquid crystal display (LCD) device, comprising:
a liquid crystal panel;
a backlight unit below the liquid crystal panel; and
a viewing angle control film between the liquid crystal panel and the backlight unit,
wherein the viewing angle control film includes a plurality of separation wall patterns arranged into a plurality of separation wall groups that repeat along a first axis,
each of the separation wall groups comprising a set of separation wall patterns arranged asymmetrically in height between left and right directions on the first axis and extending across an entire length of the viewing angle control film along a second axis perpendicular to the first axis, each of the separation wall patterns having a constant height along the second axis.

11. A viewing angle control film for a liquid crystal display device, comprising:
a plurality of separation wall patterns arranged into a plurality of separation wall groups that repeat along a first axis,
each of the separation wall groups comprising a set of separation wall patterns arranged asymmetrically in height between left and right directions on the first axis and extending across an entire length of the viewing angle control film along a second axis perpendicular to the first axis, each of the separation wall patterns having a constant height along the second axis.

* * * * *